United States Patent [19]

Dvorscek et al.

[11] Patent Number: 4,802,995
[45] Date of Patent: Feb. 7, 1989

[54] METHOD FOR DECOMPOSING THE CYANIDE RADICAL IN CYANIDE-BEARING WASTES OR MATERIALS

[75] Inventors: John Dvorscek, Oak Lawn; William Rostoker; Arne R. Jarnholm, both of Chicago, all of Ill.

[73] Assignee: Rostoker, Inc., Burnham, Ill.

[21] Appl. No.: 59,123

[22] Filed: Jun. 5, 1987

[51] Int. Cl.$^4$ .............................................. B01D 17/00
[52] U.S. Cl. ................................... 210/761; 210/766; 210/774
[58] Field of Search ............... 210/721, 758, 774, 620, 210/761, 762, 763, 766

[56] References Cited

U.S. PATENT DOCUMENTS

| | | | |
|---|---|---|---|
| 3,878,289 | 4/1975 | Beavon | 423/219 |
| 3,920,505 | 11/1975 | Helleur | 159/47 WL |
| 4,071,448 | 1/1978 | Watanabe et al. | 210/721 |
| 4,079,585 | 3/1978 | Helleur | 60/39.02 |
| 4,116,830 | 9/1978 | Krogsrud | 210/63 R |
| 4,155,804 | 5/1979 | Edge, Jr. | 162/16 |
| 4,271,013 | 6/1981 | Bhattacharyya | 210/617 |
| 4,341,641 | 7/1982 | Novak | 210/752 |
| 4,417,963 | 11/1983 | Janne | 204/130 |
| 4,437,417 | 3/1984 | Roberts | 110/346 |
| 4,543,189 | 9/1985 | Rice et al. | 210/713 |

FOREIGN PATENT DOCUMENTS

| | | |
|---|---|---|
| 47-18765 | 9/1972 | Japan. |
| 48-81776 | 11/1973 | Japan. |
| 48-86773 | 11/1973 | Japan. |
| 50-35756 | 11/1975 | Japan. |
| 50-161069 | 12/1975 | Japan. |

OTHER PUBLICATIONS

Brag, J. L., *Non-Ferrous Metallargy*, John Wiley & Sons, NY, NY (1941), pp. 324–325.
Torpy, M. F. *Journal Water Pollution Control Federation, Electroplating and Cyanide Wastes*, vol. 51, No. 6 (Jun. 1979) pp. 1399–1401.
Vol. 4, *Metals Handbook* (9th ed.), American Society for Metals, pp. 227–229 & 248–249.
Torpy, M. F., *Journal WPCF, Electroplating and Cyanide Wastes*, Jun. 1978 pp. 1270–1277.
Cadotte, A. P., Ontario Res. Foundation, Final Report P-3083/I-3 AES Res. Prog. 53 (6-10-80) & Proposal P-3083/I Revised (7-24-79).
Clennel, J. E. *The Cyanide Handbook*, McGraw-Hill, NY, NY, (2nd ed. 1915), pp. 62–83 & 102–119.
Kirk-Othmer, *Concise Encyclopedia of Chemical Technology*, John Wiley & Sons, N.Y., N.Y. (1985), pp. 333–335, 337, 788, 789.
Author Unknown, *Electroplating & Metal Finishing Operations*, EPA Document, pp. 105, 127, 128, 144–187.
Matasa, C. et al, *Basic Nitrogen Compounds*, 3rd ed., Chemical Publishing Co., Inc. N.Y. 1973, pp. 392–420.
Vol. 2 *Metals Hand Book*, ASM (8th ed. 1964) pp. 145 & 417, Heat Treating, Cleaning & Finishing.
Chemical Abstracts, vol. 83, 1975, 60-Sewage Wastes paragraph 32753c.

Primary Examiner—Frank Sever
Attorney, Agent, or Firm—Arne R. Jarnholm

[57] ABSTRACT

A method for decomposing the cyanide radical in cyanide-bearing wastes or materials. The cyanide radical of cyanide compounds contained in cyanide-bearing wastes or materials is chemically decomposed. In the preferred embodiment, the cyanide-bearing waste or material and water are introduced into a closed retort. The closed retort is heated and maintained at a temperature above a critical temperature and the cyanide radical is decomposed by reaction with water. At least two new compounds are formed, one of which contains the carbon constituent and the other of which contains the nitrogen constituent of the cyanide radical. The gaseous components which form in the closed retort are vented therefrom and may be condensed. The nongaseous components which form in the closed retort are accumulated therein and removed periodically.

30 Claims, 5 Drawing Sheets

METHOD FOR DECOMPOSING THE CYANIDE RADICAL IN CYANIDE-BEARING WASTES OR MATERIALS

BACKGROUND OF THE INVENTION

1. Field of the Invention

The present invention relates generally to the chemistry of cyanide compounds and more specifically to a method for decomposing the cyanide radical in those compounds. The method is particularly well-suited for treating high concentration, cyanide-bearing hazardous wastes, such as those generated by electroplating, stripping and heat treating operations.

2. Description of the Prior Art

As used herein, the term "cyanide compound" means any chemical compound which includes, as a part of its structure, one or more cyanide radicals. The cyanide radical is characterized by a triple-bonded arrangement of carbon and nitrogen (in a one-to-one atomic ratio), which generally behaves in a monovalent fashion. The cyanide radical may bond in a covalent manner and form a part of another radical, such as in the case of a cyanate, or may bond in an ionic manner, such as in the case of a cyanide salt. Thus, cyanide compounds include nitriles, cyanates, cyanogen, cyanamide, hydrogen cyanide, complex metal cyanides (such as ferrocyanides), alkali-metal cyanides, ammonium cyanide and alkaline-earth metal cyanides.

As used herein, the term "cyanide-bearing" waste, or material, means a waste product or a material which includes a substantial amount of concentration of one or more cyanide compounds. A substantially pure, or even reagent grade cyanide compound is, therefore, included in this definition. Because cyanide compounds are so highly toxic, a concentration of only a few parts per million (ppm), by weight of the cyanide radical, may be considered substantial. Thus, relatively low concentration wastes and materials are also considered herein to be "cyanide-bearing".

It follows then, by definition, that a cyanide-bearing waste or material contains a substantial quantity or concentration of cyanide radical. The presence of the cyanide radical is the only distinguishing feature of a cyanide-bearing material or waste, regardless of any other compounds or elements which may be chemically associated or bonded with the cyanide radical. Likewise, for purposes of this invention, the composition of the bulk waste or material which carries the cyanide compound is largely irrelevant, so long as it does not prevent the decomposition of the cyanide radical in accordance with the present invention. Unless otherwise specifically designated, the term "cyanide concentration", as used herein, will always refer to the weight of cyanide radical, in the cyanide-bearing waste or material, expressed in parts per million.

A large number of chemical processes, especially in the metals industries, generate cyanide-bearing wastes. Heat treating, precious metals recovery from ore, electroplating and stripping of plated deposits are some of the activities which often produce such hazardous wastes.

In the heat treatment and case hardening of ferrous alloys, molten salt baths, which may contain sodium, calcium and potassium cyanide, are often employed. The salt baths cause the formation of a high hardness case, which includes carbides and nitrides. The molten salt bath also brings the workpiece above the austenitizing temperature of most steels, thereby permitting additional hardening by quenching in an oil or water bath. This results in substantial amounts of cyanide salts being carried over to the quenching solution. Cyanide concentrations of ten to thirty thousand ppm are typical.

Many electroplating processes employ cyanide salts in the electrolyte. After plating, the workpiece is washed by immersion in a plurality of rinse water tanks. Residual cyanide electrolyte (termed "drag-out") is carried out by the workpiece and diluted in the rinse water.

The drag-out rinse tanks are frequently fed with a counter-current flow of fresh water. For example, in a three tank arrangement, the drag-out concentration is highest in the first tank, lower in the second and lowest in the third or final tank. Fresh rinse water is introduced only to the final rinse tank. As the final tank overflows, the effluent is directed to the second tank, which overflows to the first tank. The relatively high concentration overflow from the first tank is diverted for cyanide destruction and the removal of dissolved metals.

Typically, the cynaide concentration is electroplating rinse waters is about two to three hundred ppm. Prior to disposal, most municipal sewage treatment facilities require that concentration be brought down to an upper limit, usually set between one and ten ppm. Often, alkaline chlorination is used to decompose the cyanide radical. This process is carried out by first adjusting the pH of the solution and then bubbling with chlorine gas or making additions of sodium hypochlorite. A polymer flocculent may be added to the waste water stream as it is diverted to a large settling tank termed a "clarifier". The flocculent causes agglomeration of the insoluble metal compounds which then settle as a sludge. The sludge, which contains substantial quantities of residual cyanide (one thousand ppm is not uncommon) is then dewatered in a filter press and sent out for land fill disposal.

Highly concentrated solutions of cyanide (typically between about 30,000 and 100,000 ppm) are used to strip plated deposits of various metals from workpieces. Stripping may be used when a substandard or defective plate is applied to an otherwise salvageable workpiece. Examples include tubular frame furniture and automobile bumpers, where a smooth nickel underlay is necessary prior to chromium plating.

The need for stripping is also encountered when a ferrous workpiece requires electroplating subsequent to gas carburizing. The fastener industry fabricates a type of bolt which has a washer permanently affixed to the bolt head or slidably affixed to the bolt shank. It is often desirable to case harden the bolt but not the washer. The washer can be isolated from the carburizing gas by selectively electroplating it with a thin deposit of copper. Because carbon has a very low solubility in copper, even at carburizing temperatures, the washer does not case harden.

After carburizing, the bolt and washer units are sent to the electroplater for finishing. It is generally necessary for the electroplater to strip the copper deposit from the washer before applying the finish plate.

Many types of stripping solutions are commercially available. Some, which work quite rapidly, employ a reverse or "deplating" direct current to facilitate stripping. Others, which generally strip at a slower rate, rely only on the chemical action of the solution to dissolve the plate. Both processes have the drawback that they often cause some of the base metal from the workpiece to go into solution. In the case of ferrous alloy base metals, this may cause the formation of complex ferrocyanides, which are not readily decomposed by prior art methods of cyanide destruction. It is believed that the use of a depleting current exacerbates this problem.

Once the stripping solutions are saturated with metals, or become "spent", they must be disposed of. Some electroplaters trickle the spent stripping solution into the drag-out rinse overflow and treat by chlorination. The disadvantage of this method is that the stripping solution must be added slowly, so that the cyanide concentration does not exceed the ability of the chlorination process to destroy it. In addition, this method substantially increases the amount of chlorination (and therefore the cost) required to treat the waste water.

Many independent waste treatment facilities have been constructed to handle cyanide-bearing wastes. While the processes employed by those treaters are unknown to the present inventors, it has been reported to them by some electroplaters that prices of up to fourteen dollars per gallon are currently being charged for the treatment of spent stripping solutions. It has also been reported that many waste treaters refuse to accept high concentration cyanide-bearing wastes, at any price.

Other methods have been reported as capable of removing cyanide from aqueous waste solutions. Some of these methods precipitate the cyanide by forming a relatively insoluble compound, such as is disclosed in U.S. Pat. No. 4,543,189 Rice et al. *REMOVAL OF COMPLEXED ZINC-CYANIDE FROM WASTEWATER.* The precipitate, however, presents a new disposal problem as it comprises concentrated cyanide compounds.

Other methods have been developed to decompose cyanide ions in solution by employing electrolysis. (See for example U.S. Pat. No. 4,417,963 Janne, *PROCESS FOR REMOVING CYANIDE IONS FROM SOLUTIONS.*)

Still another method of decomposing cyanides has been proposed by the Ontario Research Foundation, Sheridan Park Research Community, Mississauga, Ontario, Canada L5K 1B3. This method is disclosed in a report prepared for The American Electroplater's Society, 1202 Louisiana Ave., Winter Park, Fla. 32789, designated as *AES Research Project* 53, *Final Report P-3083/I-3.* The report was authored by A. P. Cadotte and bears a date of June 10, 1980.

The Ontario Research Foundation suggests that cyanide can be broken down to ammonia and formic acid by hydrolysis conducted at elevated temperatures and pressures. Specifically, the report recommends treating aqueous cyanide solutions in the liquid phase and at a temperature between about 190° C. and 275° C. Corresponding pressures range between about 250 and 900 psig.

On the basis of laboratory trials, the removal of up to 99.998% of the cyanide from high concentration solutions (defined therein as about 50 grams of cyanide per liter) and 99.9% from low concentration solutions (defined therein as 100 milligrams cyanide per liter) was predicted. The suggested residence times in the reaction vessel were, however, as much as 6 to 8 hours for high concentration solutions and 2 to 3 hours for low concentration solutions.

The drawbacks of this process are numerous. A large capital investment is necessary to construct a reaction vessel capable of operating at the suggested temperatures and pressures. The rate of cyanide decomposition is relatively slow and extreme safety precautions must be taken to ensure that such a reaction vessel retains its structural integrity during repeated use.

BRIEF SUMMARY OF THE INVENTION

In accordance with the method of the present invention, a substantial quantity of the cyanide radical in a cyanide-bearing material is chemically decomposed.

The cyanide-bearing material and water are introduced into a "closed" retort. A "closed" retort includes an isolated volume into which only the desired chemical charge, and no other chemicals or compounds, are intentionally introduced. The retort is heated and maintained above a "critical" temperature of reaction between water and the cyanide radical in the cyanide-bearing waste or material. The reaction is preferably carried out substantially at or near atmospheric pressure. The gaseous or volatile products which result are vented from the closed retort as the reaction proceeds and the nonvolatile products are removed from the closed retort after the reaction is complete.

The "critical" temperature of the method of the invention is defined as: that temperature at which a chemical reaction between the water and cyanide radical breaks the chemical bond between the carbon and nitrogen constituents of the cyanide radical, in a substantial quantity of the cyanide compound in the cyanide-bearing material; and that temperature at which the cyanide concentration of the gaseous, or volatile products of the reaction begins to decrease with increasing retort temperature.

The reaction is characterized by the formation of at least two new chemical products, one of which includes th carbon constituent and the other of which includes the nitrogen constituent of the cyanide radical. It is believed that the new product which includes the carbon constituent of the cyanide radical is elemental carbon, carbon dioxide, carbon monoxide, a carbonate or a combination of any two or more of the aforesaid. It is also believed that the new product which includes the nitrogen constituent of the cyanide radical is diatomic nitrogen, ammonia, a nitride, an oxide of nitrogen or a combination of two or more of the aforesaid.

In one embodiment of the invention, the cyanide-bearing material is an aqueous cyanide solution and already includes sufficient water to carry out the reaction of the invention. The closed retort is heated and maintained at a temperature in excess of the critical temperature and the aqueous cyanide solution is introduced into the closed retort. The aqueous solution undergoes "flash" evaporation in the elevated temperature environment of the closed retort and the water and cyanide radical react as previously described. For aqueous sodium cyanide solutions and spent stripping solutions which employ sodium cyanide, the critical temperature has been found to be about 500° C. or thereabouts.

For cyanide-bearing materials in the form of aqueous solutions, it is convenient to introduce the water into the retort as a liquid. The water serves a dual purpose, acting as a reactant and a vehicle, carrying the cyanide compound into the retort. In the case of solid cyanide-bearing materials, the water may be introduced into the retort as a liquid or as a vapor, such as steam (or even conceivably as solid ice). In either case, the magnitude of the critical temperature insures that water in the retort is quickly converted to steam.

In another embodiment of the invention, as an additional step, oxygen is introduced into the closed retort along with the cyanide-bearing material and water. The extent of cyanide decomposition (as measured by the cyanide concentration in the volatile products and residue in the retort) is substantially enhanced by the step of adding oxygen.

The reaction of water with a cyanide radical causes the formation of ammonia, which may pose a pollution problem in itself. The step of adding oxygen to the retort eliminates substantially all ammonia from the volatile products of the reaction. It is, however, known by those skilled in the art, that the oxidation of ammonia under certain conditions results in the formation of oxides of nitrogen. Thus, in still another embodiment of the invention, the temperature of the closed retort and the ratio of oxygen input to ammonia generation is controlled to minimize the generation of oxides of nitrogen.

The method of the present invention overcomes the drawbacks of the prior art, being safe and economical to practice and very effective for treating high concentration, aqueous cyanide solutions or cyanide-bearing solids.

It is therefore a primary object of the present invention to provide a method for chemically decomposing the cyanide radical in cyanide-bearing wastes or materials, regardless of the form of those wastes or materials: solid, liquid or gas.

It is also an object of the present invention to provide a method for chemically decomposing the cyanide radical in cyanide-bearing wastes or materials that can be carried out at or near ambient pressure.

Another object of the present invention is to provide a method for chemically decomposing the cyanide radical in aqueous cyanide solutions, which produces an effluent or effluent fraction that requires little or no further treatment in order to meet toxicity limits for disposal, as stipulated by State and Federal Environmental Protection Agencies.

Still another object of the invention is to provide a method for chemically decomposing the cyanide radical in spent, aqueous metal-stripping solutions which separates the water fraction from the dissolved solids fraction of the stripping solutions.

A feature of the present invention is that the apparatus and energy requirements for practicing the invention are relatively inexpensive.

Another feature of the present invention is that the method does not require the addition of any other potentially hazardous or costly chemicals.

The foregoing objects and features, as well as others, will become evident to one skilled in the art from the following detailed description of the invention and accompanying drawings of which.

DETAILED DESCRIPTION OF THE INVENTION

Figure 1:
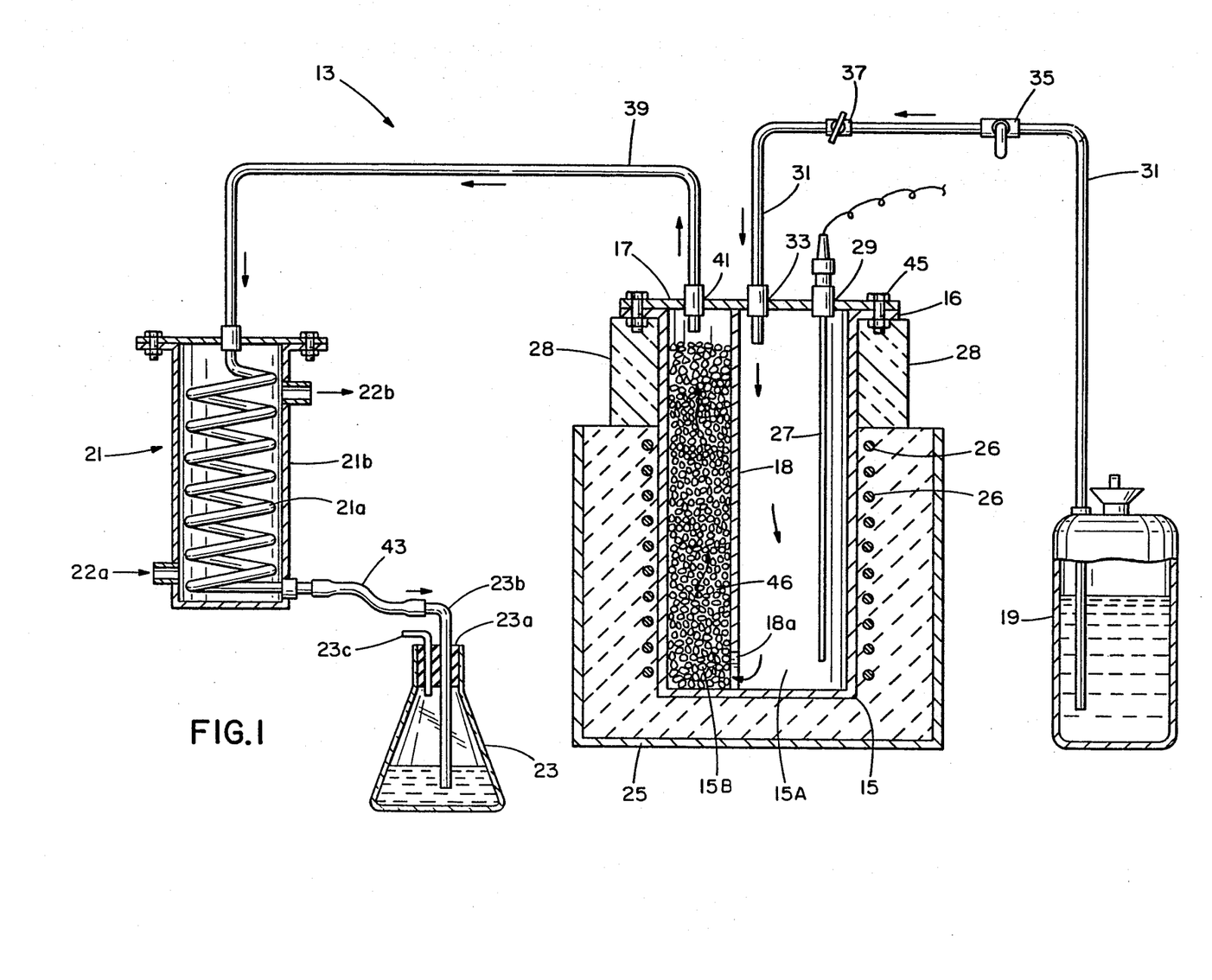
FIG. 1 is a front elevation of the apparatus used to practice the method of the present invention on aqueous cyanide solutions and includes a holding receptable, a closed retort and a condenser. For purposes of clarity, most of the apparatus is shown in cross-section or break-away views.

In FIG. 1 there is illustrated an apparatus, generally indicated by reference numeral 13, which was used to practice the method of the present invention. This apparatus 13 (along with the various modifications described and illustrated herein) was used to obtain the results of the experiments reported below. From the drawings and the following detailed description of the invention, it will become clear to one skilled in the art, that other and similar types of apparatus could be constructed to practice the invention. It will also become clear to one skilled in the art, that the description of this apparatus is included for purposes of clarifying the method of the present invention and that the invention should be limited only by the claims included herewith.

Referring now specifically to FIG. 1, it can be seen that the apparatus 13 comprises: a "closed" retort 15, which includes a sealable lid 17; a holding receptacle 19; a condenser 21, which includes a condensation coil 21a surrounded by a water jacket 21b; and a receiver 23 (1000 ml Pyrex Erlenmeyer flask), having a stopper 23a, fitted with inlet and exhaust tubes 23b and 23c, respectively. Water flows through the water jacket 21b, in the direction of the arrows, entering at inlet 22a and exiting at outlet 22b, to cool the condenser 21. The "closed" retort 15 is heated by an electrical resistance furnace 25 having heating elements shown at 26. The furnace 25 was manufactured by Lindberg Co. of Watertown, Wis. and included a power source with a temperature controller (not shown in the drawings). The controller automatically delivered power to the resistance furnace 25 when the temperature of the furnace 25 fell below a set point temperature which was programmed by the operator. Insulative batting 28 was wrapped around the exposed top of the "closed" retort 15 to minimize interior temperature gradients. The temperature inside the retort was measured by a sheathed, chromel-alumel thermocouple 27, inserted through a first aperture 29 in the retort lid 17.

As previously explained, the term "closed" retort is defined herein as a retort which includes an isolated volume into which only the desired chemical charge (such as a cyanide-bearing waste and water), and no other chemicals or compounds (such as fuels for heating), are intentionally introduced.

Another type of retort, referred to herein as an "incineration" retort, is distinguishable from a closed retort in that it includes no isolated volume specifically for the chemical charge. That is to say, an incineration retort is heated by means of fuel combustion which takes place in the same volume that carries the chemical charge. The chemical charge intimately mixes with and may react with the heating fuel, combustion air or oxygen and the products of fuel combustion. Furthermore, the chemical charge is exposed to the flame temperature generated by fuel combustion, which is typically several hundred or even thousands of degrees higher than the temperature of the retort. Such elevated temperatures can produce reactions in the charge that are radically different from those which occur at the lower temperature of the retort itself.

A herbicide or insecticide sprayer, called a Hudson Sprayer (manufactured by H. D. Hudson Co. of Chicago, Ill.), was used as the holding receptacle 19, which was filled with either an aqueous cyanide solution or water. The Hudson Sprayer could be pressurized with air so that the cyanide solution or water could be force fed into the closed retort 15 through input conduit 31, which traversed the holding receptable 19 and the retort lid 17, entering the closed retort 15 through a second aperture 33. Input conduit 31 was fabricated from ⅜ inch O.D. thin walled, plain carbon steel tubing. A steel ball cock 35 and a steel needle valve 37 were disposed in series in input conduit 31, intermediate the holding receptacle 19 and closed retort 15. The ball cock 35 provided simple on-off flow control of the cyanide solution or water and needle valve 37 permitted metering of the flow rate.

In some instances, a flow indicator, which included a needle valve assembly, was substituted for the steel needle valve 37. Brooks Instrument Division of Emerson Electric Co., Hatfield PA. provides such a flow indicator that withstands the corrosive effects of cyanide solutions. In most experiments, a constant flow rate of cyanide solution was established exterior of the retort 15, before cyanide decomposition was initiated.

An output conduit 39 (also fabricated from ⅜ inch plain carbon steel tubing) was run from the interior of the closed retort 15, through a third aperture 41 in the retort lid 17 to the inlet end of the condensation coil 21a in condenser 21. Finally, a third conduit 43, in the form of plastic tubing (Tygon brand from Northrup Plastics), was connected between the exit end of the condensation coil 21a and the inlet tube 23b of the receiver 23. Thus, the volatile or gaseous products of the cyanide decomposition and any excess water vapor were vented from the closed retort 15 and the condensable fractions accumulated in the receiver 23. The noncondensable gaseous fractions of the cyanide decomposition were allowed to escape the receiver via exhaust tube 23c. As a safety precaution, these noncondensable fractions were generally vented to the outside air by means of an exhaust fan (not shown).

Figure 1A:
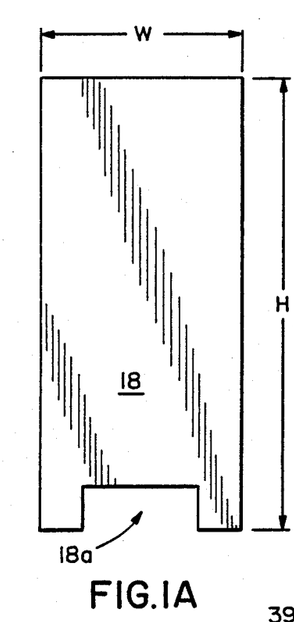
FIG. 1A is a front elevation of the baffle shown only in cross section in the closed retort in FIG. 1.

The interior of the retort 15 was fitted with a steel baffle 18, shown in FIGS. 1 and 1A. The closed retort 15 had a round transverse cross section and the dimensions of the baffle were chosen so that its width, W, and the height, H, were nearly equal to the inside diameter and height of the retort 15. Thus, the baffle 18 fit snugly against the walls of the retort 15, traversing its diameter and dividing it into two separate and substantially equal volumes, 15a and 15b. (In the drawings, baffle 18 is shown slightly off-center in the retort 15, to prevent crowding of the elements in the illustration.)

Retort volumes 15a and 15b were in communication by means of a rectangular notch or opening 18a in the bottom of baffle 18. Thus, any gaseous products which formed from the introduction or reaction of water and cyanide-bearing material into volume 15a, were forced to travel down the full length of volume 15a and up the full length of 15b, ensuring passage through the bottom or "hot zone" of the retort 15 before escaping via aperture 41 and through conduit 39.

It was noted that the effectiveness of cyanide decomposition, as conducted in accordance with the present invention, was improved by the use of baffle 18 in the closed retort 15. It is speculated that, without the baffle, the above-mentioned gaseous products exit the retort via the shortest and least resistant path, traveling directly from the vicinity of aperture 33 to aperture 41 and by-passing the bottom or "hot zone" of the closed retort 15.

As discussed below in connection with the experiments, it is believed that a substantial amount of the cyanide decomposition of the present invention occurs in the gas phase. It was reasoned, therefore, that imparting turbulence to these gases would increase their mixing, allowing for more complete reaction and enhancement of cyanide decomposition.

Means for creating turbulence 46 was fabricated by compacting a length of coarse, steel wire mesh into retort volume 15b. Thus, any gases which formed during cyanide decomposition would have to travel the convoluted path between the wires of the mesh 46 before being vented through aperture 41.

Efforts were made to ensure that the apparatus 13 was as gas tight as possible. The closed retort 15 was fabricated from a twenty inch length of schedule 10, 4 inch, black steel pipe, with a circular, quarter inch steel plate welded in place over one of its ends. A flange 16, also formed from quarter inch steel plate, was welded about the circumference of the pipe at the opposite end. A high temperature compression gasket (not shown) was placed over flange 16 and the retort lid 17 was secured to the flange by a plurality of bolts 45.

Each of the apertures 29, 33 and 41 in the retort lid 17 had a standard pipe coupling welded in place. Steel compression fittings were screwed into the pipe couplings and used to secure the ⅜ inch steel tubing and sheathed thermocouple 27. Liberal amounts of pipe joint compound were used on each of the fittings and all joints were tested for gas leaks during actual operation.

Because many cyanide compounds have an extremely corrosive effect on copper, zinc, nickel and their alloys, no parts fabricated from those metals, or their alloys, were used in the construction of the closed retort 15. The condenser 21, as well as any other component parts of the apparatus which were apt to come in contact with cyanide, were all fabricated from plain carbon steels. This material proved to have the ability to withstand many runs without showing signs of deterioration.

Using the above-described apparatus 13, a number of experiments were conducted to determine the effectiveness of the method of the invention with respect to various types of cyanide-bearing solutions and solid compounds. Experiments were also conducted to determine how the operating parameters of the method of the invention could be varied to maximize the efficiency of cyanide decomposition.

EXPERIMENT 1

This experiment was conducted to measure the efficiency of cyanide destruction as a function of retort temperature for four aqueous cyanide solutions of varying concentration.

Four separate, aqueous cyanide solutions were prepared by mixing the appropriate quantity of pure, reagent grade sodium cyanide with tap water. Solutions of the following cyanide concentrations were prepared: SOLUTION 1—145,300 ppm; SOLUTION 2—95,670 ppm; SOLUTION 3—30,140 ppm; and SOLUTION 4—976 ppm. Each of the solutions was then treated as follows:

Input conduit 31 was disconnected from retort lid 17 at aperture 33. Needle valve 37 was turned to the fully closed position and a known volume of one of the above sodium cyanide solutions was placed in holding receptacle 19. The holding receptacle 19 was then pressurized with air and, with the ball cock 35 in the full open position, adjustments were made to needle valve 37 to establish a drip rate between about five and ten ml of solution per minute. Ball cock 35 was then shut off and input conduit 31 reconnected to the closed retort 15 at aperture 33 in the retort lid 17.

The closed retort 15 was first heated to a temperature of 300° C. and ball cock 35 opened, causing the aqueous cyanide solution to drip into volume 15a at the predetermined rate. Upon entering volume 15a, the aqueous cyanide solution underwent "flash evaporation" and reaction between the water and cyanide compound was initiated.

As used herein, the term "flash" evaporation means very rapid or almost instantaneous evaporation, as will occur when a relatively small quantity of an aqueous solution (thus, having a corresponding, relatively small heat capacity) is brought into contact with a surface or environment which is at a temperature substantially in excess of the boiling point of the aqueous solution and which has a relatively large heat capacity. If cyanide solution is introduced at too rapid a rate or if the heat capacity or or thermal input to the retort 15 is inadequate, liquid cyanide solution will accumulate and boil in the bottom of the retort, defeating flash evaporation.

As more of the aqueous cyanide solution was flash evaporated in closed retort volume 15a, the gaseous components of the previously flash evaporated and reacted solution were displaced and driven up volume 15b, finally being vented from the closed retort 15 through aperture 41. The gaseous components were then conveyed to the water-cooled condenser 21 via conduit 39 and the condensate which formed was collected in receiver 23. The flow of solution and gases is generally shown by arrows in FIG. 1.

After approximately one hour, ball cock 35 was closed, halting the introduction of cyanide solution, and the remaining condensate was permitted to drain into the receiver for about five minutes. The condensate was removed from the receiver 23 and the cyanide concentration determined.

The procedure was repeated for each of the four sodium cyanide solutions with retort temperatures of 400° C., 500° C., 600° C., 700° C. and 800° C. Table 1 shows the concentrations of cyanide in the condensate, which resulted from each of the four sodium cyanide solutions treated in accordance with the above procedure.

TABLE 1

| | CYANIDE CONCENTRATION [PPM] | | | |
|---|---|---|---|---|
| RETORT TEMP. | SOL. 1 145,300 | SOL. 2 95,670 | SOL. 3 30,140 | SOL. 4 976 |
| 300° C. | 3,000 | 2,200 | 1,170 | 147 |
| 400 | 6,100 | 5,380 | 2,480 | 296 |
| 500 | 19,500 | 15,700 | 5,850 | 354 |
| 600 | 9,790 | 5,080 | 3,340 | 173 |
| 700 | 6,520 | 563 | 1,810 | 34.6 |
| 800 | — | 260 | 800 | 14.8 |

Figure 2:
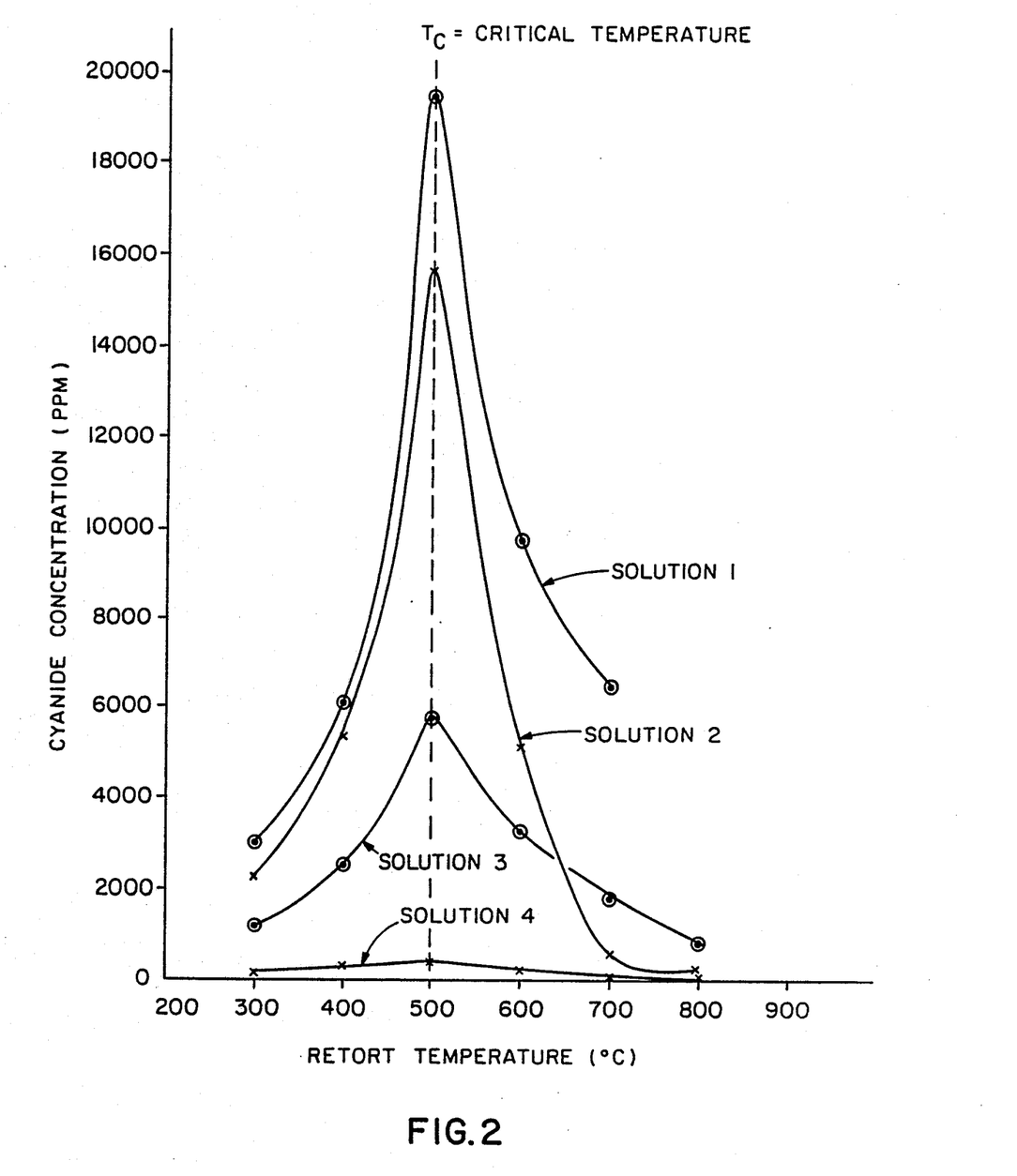
FIG. 2 is a graph showing the cyanide concentration of the condensed fraction of the volatile effluent, as a function of retort temperature, for four different concentrations of aqueous cyanide solutions treated in accordance with the method of the invention.
Figure 3:
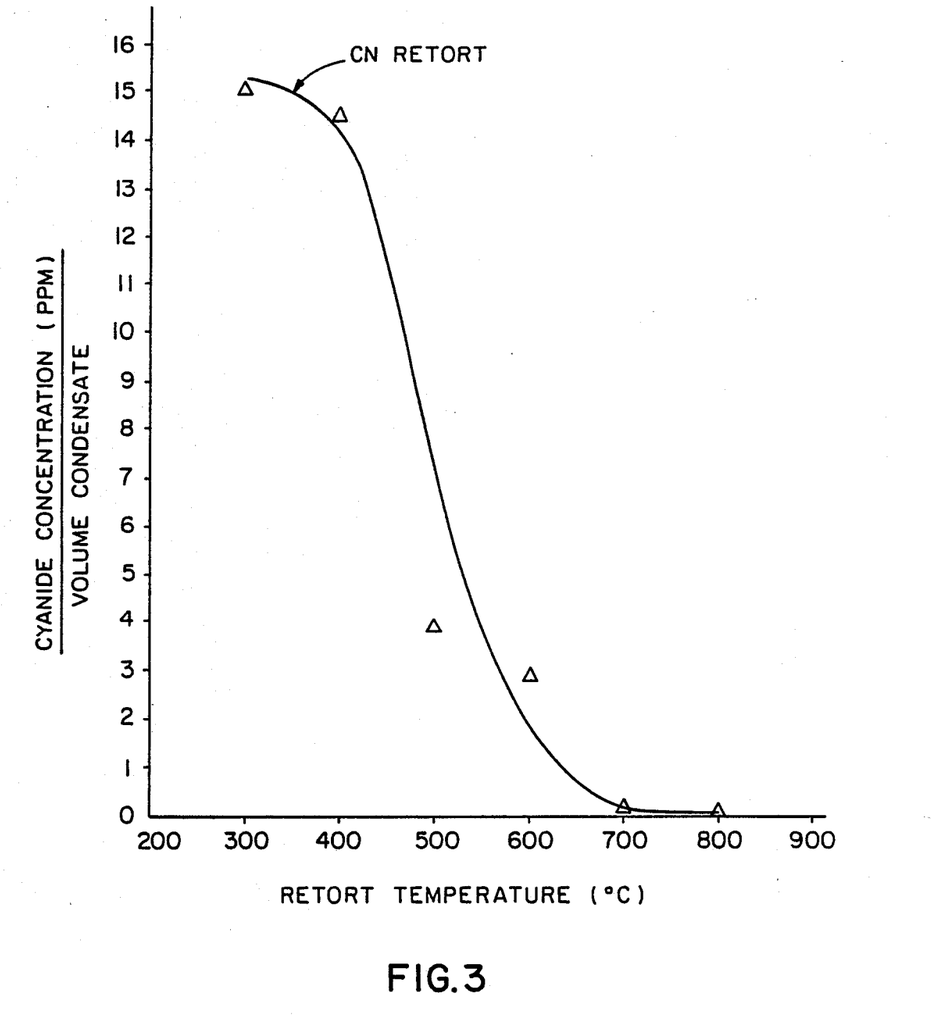
FIG. 3 is a graph of the cyanide concentration of retort residue (formed during treatment of an aqueous cyanide solution), dissolved in one liter of water, normalized for the quantity of aqueous solution treated and plotted as a function of temperature.

A graph of the data contained in TABLE 1, cyanide concentration in the condensate as a function of the temperature of the closed retort 15, is shown in FIG. 2. It can be seen that, for each of the four solutions, the cyanide concentration in the condensate increased until the retort temperature exceeded about 500° C. At retort temperatures in excess of about 500° C. the cyanide concentration decreased dramatically. The temperature at which this marked decrease takes place is defined herein as the critical temperature, $T_c$. Surprisingly, the initial cyanide concentration of the solution which was introduced into the retort 15 had no effect on the determination of the critical temperature, $T_c$.

It was expected that flash evaporation of the aqueous cyanide solution would result in the production of superheated steam and the precipitation of the sodium cyanide solute in a finely dispersed form. However, because aqueous cyanide solutions are known to hydrolyze, it was also expected that hydrogen cyanide gas would form during flash evaporation. The hydrolysis of sodium cyanide to sodium hydroxide and hydrogen cyanide may be written as follows:

$$NaCN + H_2O = HCN + NaOH \qquad (1)$$

Thus, it was thought that flash evaporation of the aqueous sodium cyanide solution would result in gas comprising a mixture of superheated steam and hydrogen cyanide and a precipitate comprising a mixture of sodium cyanide and sodium hydroxide.

Hydrogen cyanide is extremely volatile (having a boiling point just above room temperature) and is infinitely soluble in water. Therefore, it is reasonable to suspect that nearly all the hydrogen cyanide formed in, or present in the closed retort 15 during the above-described treatment, was vented, condensed and contained in the condensate collected in receiver 23.

Furthermore, the composition of the reactants ($H_2O$ and NaCN) does not suggest the formation of any other volatile cyanide compound. Therefore, it is reasonable to conclude that the cyanide in the condensate is due primarily to the presence of hydrogen cyanide.

It is well-known in the art that the rate at which chemical reactions proceed, and the extent to which they proceed, are influenced by temperature. It was anticipated then, that the hydrolysis of sodium cyanide to form hydrogen cyanide (also known as hydrocyanic acid) would increase with increasing retort temperature. Clearly, the graph in FIG. 2 demonstrates that temperature dependent increase in the formation of hydrogen cyanide, but only until the retort reaches the critical temperature, $T_c$. The decrease in the cyanide concentration of the condensate, as a function of temperature when the retort temperature exceeds the critical temperature, is an wholly unexpected and heretofore unknown phenomenon.

It was also noted that each of the condensate samples had a strong odor of ammonia and a correspondingly high pH. A number of the condensate samples also contained a finely divided, black powder having the appearance of carbon. This black powder was noted primarily in condensate samples which were obtained at retort temperatures above the critical temperature, $T_c$.

Treatment of the cyanide solutions in EXPERIMENT 1 also resulted in the formation of a residue inside the retort 15. This residue appeared as a grey solid adhering to the retort walls. When dissolved in water, the residue did not produce as high a pH as would be expected if the residue was, in fact, pure sodium hydroxide. Surprisingly, the residue was found to contain substantial amounts of sodium carbonate.

These observations lead to a second experiment conducted to investigate the reactions which contributed to the dramatic decrease of cyanide concentration in the condensate at retort temperaures above $T_c$.

EXPERIMENT 2

In EXPERIMENT 2, Solution 3 from EXPERIMENT 1 (30,140 ppm CN) was again treated as above except that, at the end of each hour at the given retort temperature, the retort 15 was cooled. The cyanide concentration of the condensate which was collected at each temperature was determined. In addition, one liter of tap water was then used to dissolve the residue and the residue solution was analyzed for cyanide, NaOH and $Na_2CO_3$. In order to normalize the data associated with the residue for possible variations in the rate at which solution was introduced into the retort, the residue concentrations (in ppm) were divided by the volume of condensate (in ml) collected at each temperature.

The cyanide concentration in the condensate, as a function of retort temperature, behaved identically to the results obtained in EXPERIMENT 1, showing the characteristic peak at about 500° C., the previously determined critical temperature.

Figure 4:
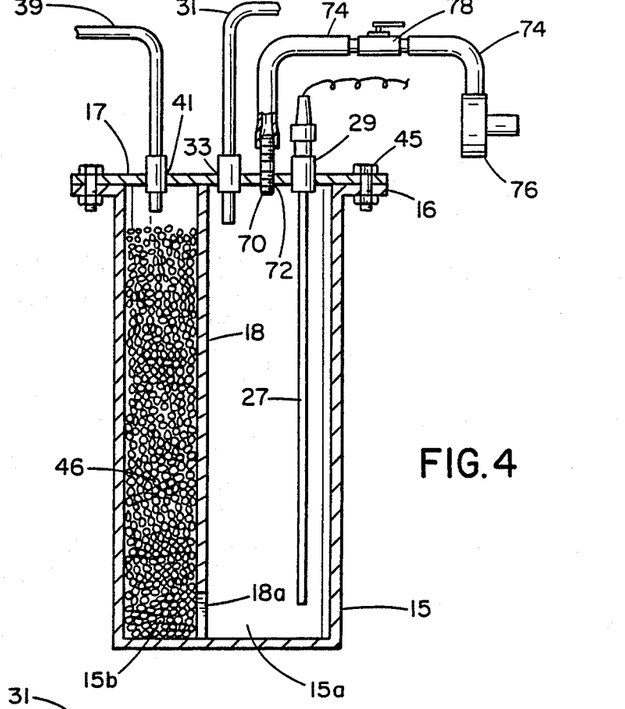
FIG. 4 is a cross-sectional, front elevation of the closed retort shown in FIG. 1, but which has been modified to include means for introducing oxygen or air into the retort.

It was found that the normalized NaOH concentration in the residue solution generally decreased with increasing retort temperaure, the steepest reduction taking place at about 500° C., the critical temperature. Conversely, the $Na_2CO_3$ concentration generally increased with increasing retort temperature, the steepest increase also occurring at or about 500° C., the critical temperature. Most importantly, the normalized cyanide concentration of the residue solution, shown in FIG. 4., drastically decreased at about 500° C., the critical temperature. (At retort temperatures of 700° C. and above, the data for NaOH did not follow a smooth curve. It is believed that this anomaly was due to some external source of contamination and not representative of the trend observed at lower temperatures.) The results of EXPERIMENT 1 showed that when the retort temperature is maintained below the critical temperature, hydrolysis of NaCN to produce HCN, increases with increasing temperature. It also suggests that a substantial portion of the HCN is decomposed as follows:

$$HCN_{(g)} + H_2O_{(g)} = NH_{3(g)} + CO_{(g)} \quad (2)$$

Furthermore, the results of EXPERIMENTS 1 and 2 suggest that the formation of sodium carbonate and the finely dispersed black powder (believed to be carbon) may result from the following reactions:

$$2NaCn + 3H_2O = Na_2CO_3 + C + 2NH_3 \quad (3)$$

$$2NaCN + 3H_2O = Na_2CO_3 + NH_3 + HCN + H_2 \quad (4)$$

It is believed that reactions (2), (3) and (4) all contribute to the decomposition of cyanide at retort temperatures above and below $T_c$. Ammonia is present in the condensate and sodium carbonate and sodium hydroxide are both found in the residue at retort temperatures above and below the critical temperature. Nonetheless, the amount of cyanide in the condensate and the amount of cyanide, sodium hydroxide and sodium carbonate in the residue, when observed as a function of temperature, clearly suggest that above the critical temperature, reactions (2), (3) and (4) occur to such an extent that very efficient decomposition of the cyanide radical takes place.

It should be noted that reactions (2), (3) and (4) are all hydrolysis reactions, in that they involve the decomposition of a cyanide compound by reaction with water. Furthermore, it should be noted that reaction (4) shows the hydrolysis of a cyanide compound to form both hydrocyanic acid (hydrogen cyanide) and a carbonate. It is believed that the hydrocyanic acid formed by reaction (4) is readily decomposed by further hydrolysis via reaction (2).

As used herein, the term "hydrolysis" should be understood as being used in its broadest sense. That is to say, the term is not limited to describing reactions which occur in aqueous solution between water and a soluble salt. As used herein then, the term "hydrolysis" means the decomposition of a compound by reaction with water, yielding at least two new products which contain one or the other of the chemical constituents (hydrogen or oxygen) of the water.

Hydrolysis reactions (1), (3) and (4) can be written in a generic manner, as follows, for cyanide compounds of the form $M(CN)_x$, where M is a metal, alkali metal, alkaline-earth metal or radical, which forms an hydroxide and a carbonate, and x is the valency of the metal, alkali-metal, alkaline-earth metal or radical:

$$M(CN)_x + H_2O = HCN + M(OH)_x; \quad (1)$$

$$(2/x)M(CN)_x + 3H_2O = M_{(2/x)}CO_3 + HCN + H_2; \quad (3)$$

and $$(2/x)M(CN)_x + 3H_2O = M_{(2/x)}CO_3 + C + 2NH_3 \quad (4)$$

It should be noted that many metals will readily form an hydroxide or carbonate, but under conditions of high temperature (such as is encountered in the retort above the critical temperature), they will often revert to an oxide, giving up $H_2O$ and $CO_2$, respectively.

EXPERIMENT 3

The ammonia which results from treating cyanide-bearing materials in accordance with the method of the present invention, may be viewed by some as a valuable by-product and by others as a secondary problem of disposal. It was therefore decided that experiments would be run to determine whether an additional step in the method of the present invention would permit the decomposition of the ammonia subsequent to or concurrent with its formation from the decomposition of the cyanide radical. Because ammonia can be oxidized to nitrogen and steam, it was decided that intentional additions of an oxygen-bearing gas would be made to the retort 15. (As used herein an "oxygen-bearing gas" means a gas which contains substantial quantities of oxygen. Thus, commercially pure or substantially pure oxygen as well as air fall within the meaning of an "oxygen-bearing gas".)

The retort lid 17 was drilled and tapped to receive a standard ⅛ inch N.P.T. nipple 70, thus providing a fourth aperture 72 for the introduction of an oxygen-bearing gas (FIG. 4). Gas conduit 74, in the form of a piece of Tygon brand tubing, was slipped over the pipe nipple 70 and secured with a stainless hose clamp. The other end of the gas conduit 74 was fitted to the exhaust port of a model 400-1901 laboratory size vacuum pump 76 (manufactured by Barnat Corp. of Barrington, IL 60010). Intermediate the fourth aperture 72 and vacuum pump 76, a plastic gas cock 78 was put in place. The gas cock 78 permitted the volume of air from the vacuum pump 76 to be metered.

The volumetric flow rate of air from the exit port of the vacuum pump 76 was measured by displacing water in an inverted graduated beaker. With the gas cock in the full open position, the flow rate of air was about 12 liters per minute and with the gas cock about ¼ open, the flow rate was about 4 to 5 liters per minute.

Next, the retort 15 was cleaned, gas conduit 74 and vacuum pump 76 connected, and the retort temperature raised to 700° C. Solution 2 from EXPERIMENT 1 (95,670 ppm cyanide) was treated in accordance with the previously-described flash evaporation method of the present invention, both with and without the intentional addition of air.

After one hour, without the use of air, approximately 200 ml. of condensate, having a cyanide concentration of 654 ppm was collected in the receiver 23. A strong odor of ammonia was associated with the condensate.

Vacuum pump 76 was then turned on and the air cock set at ¼ open as aqueous cyanide solution continued to be introduced into the retort. After one hour, 188 cc of condensate was collected. The condensate had a cyanide concentration of only 115 ppm and the odor of ammonia was greatly reduced.

Finally, the retort was again run at about 700° C. for one hour but with the gas cock full open. 275 cc of condensate, having a cyanide concentration of 69.3 ppm, was collected. The odor of ammonia was extremely faint.

From the preceding trails it was evident that the introduction of air had a very significant effect on the amount of cyanide as well as the amount of ammonia in the condensate. Reasoning that the enhanced decomposition of the cyanide may have been due to the oxygen in the air, it was decided to investigate the effect of adding commercially pure oxygen to the retort while decomposing cyanide in accordance with the present invention. Solution 3 from EXPERIMENT 1 (cyanide concentration 30,140 ppm) was flash evaporated over a temperature range of 300° C. to 800° C., at temperature intervals of 100° C., with and without the additional step of introducing commercially pure oxygen into the retort 15. An oxygen tank with a regulator (not shown in the drawings) was connected to gas conduit 74 in place of the vacuum pump 76. An oxygen flow rate of about three to four liters per minute was established. The feed rate of the solution was again maintained between about five to ten ml per minute and condensate was collected for approximately one hour at each temperature. The cyanide concentration of the condensate, generated with and without the introduction of oxygen is set forth in Table 2.

TABLE 2

| | CONDENSATE CYANIDE CONCENTRATION [PPM] | |
|---|---|---|
| RETORT TEMP. | WITHOUT OXYGEN | WITH OXYGEN |
| 300° C. | 355 | 610 |
| 400 | 3,085 | 157 |
| 500 | 7,980 | 580 |
| 600 | 7,400 | 254 |
| 700 | 2,300 | 26 |
| 800 | 450 | 33 |

Figure 5:
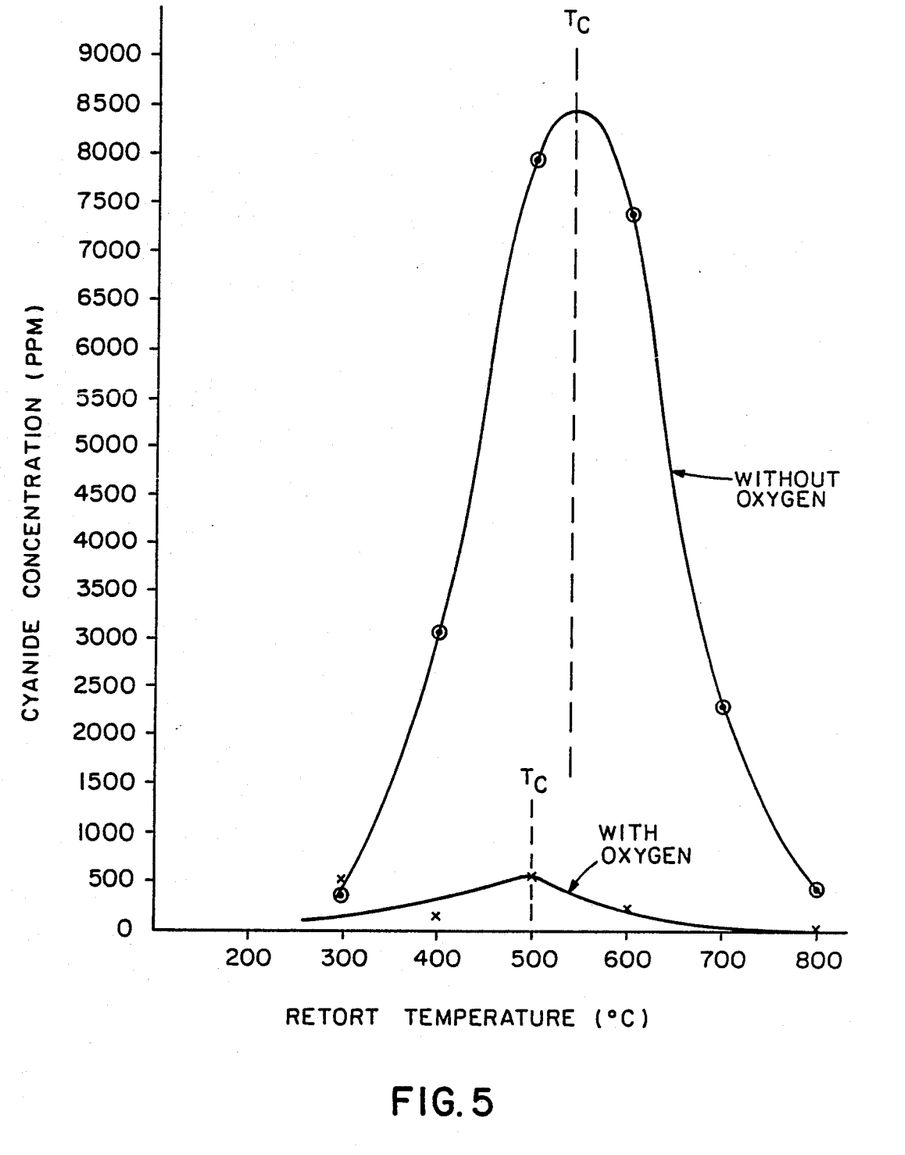
FIG. 5 is a graph of the cyanide concentration of the condensed fraction of the volatile effluent, as a function of retort temperature, for an aqueous cyanide solution tested in accordance with the invention, with and without the additional step of oxygen introduction to the retort.

A graph of the data contained in TABLE 2 is shown in FIG. 5. The cyanide concentration of the condensate, as a function of retort temperature, clearly shows the characteristic peak at the critical temperature, $T_c$, with and without the additional step of oxygen introduction to the retort. FIG. 4 also shows that the additional step of oxygen introduction may have caused slight shift in the value of $T_c$. Because EXPERIMENT 3 was conducted over 100° C. temperature intervals, the slight shift which is observed is within experimental error.

It should be noted, however, that the degree of cyanide decomposition was substantially enhanced by the introduction of oxygen to the retort. It should also be noted that with the additional step of oxygen introduction, an acceptable level of cyanide decomposition may be obtained at a lower retort temperature. Lower operating temperatures can also mean a substantial savings in energy and retort life when practicing the method of the invention.

The formation of oxides of nitrogen ($NO_x$) from the oxidation of ammonia is well-known in the art. It is also known that oxidation carried out at temperatures above about 850° C. and the use of an excess of oxygen promotes the formation of $NO_x$. Thus, the formation of $NO_x$ by the method of the present invention can be minimized by limiting the amount of oxygen introduced into the retort and by maintaining the temperature of the retort between the critical temperature and about 850° C. In order to maximize the decomposition of cyanide while at the same time minimizing the formation of $NO_x$, the retort temperature should preferably be maintained between about 700°-850° C. when intentional additions of oxygen are made.

Actual measurements of oxides of nitrogen contained in the effluent gas were made during treatment of an aqueous cyanide solution (about 30,000 ppm CN) in accordance with the present invention. The solution was flash evaporated in a closed retort maintained at a temperature of about 700° C. The amount of oxygen added to the retort was varied from about about 1.4 to about 7.3 times the stoichiometric quantity which would be needed for complete oxidation of the amount of ammonia formed as predicted by equations (2), (3) and (4). The $NO_x$ concentration in the gas was measured by use of gas detection tubes manufactured by National Draeger, Inc. (101 Technology Drive, Pittsburgh, PA 15275). Gas was drawn through the detection tubes at exhaust tube 23c associated with receiver 23.

The $NO_x$ concentration remained relatively constant over the range of oxygen input, varying only between about 1000 and 2000 ppmv (parts per million volume). This result is consistent with increased $NO_x$ production when ammonia is oxidized in the presence of an excess of oxygen. While the concentration of the $NO_x$ remained relatively constant, the volume of effluent gas, and therefore the dilution of the $NO_x$, increased with increased oxygen input.

It is believed that flash evaporation and hydrolysis of the cyanide compound can take place in a more efficient manner if the aqueous cyanide solution is introduced into the closed retort as an atomized spray. The fine droplets formed by such a spray will allow for greater surface area of the dissolved solids which precipitate and should promote their reaction with the gaseous water. If an oxygen-bearing gas is also introduced into the closed retort, it can be used to mechanically atomize the aqueous solution and promote greater mixing of the reactants.

EXPERIMENT 4

It is believed that one of the primary uses for the invention will be to decompose spent stripping solutions which are generated by the plating industry. Thus, it was decided to determine how effectively the method of the invention could decompose such a waste solution.

One liter of Stutz N.S. Metal Stripper (supplied by the Stutz Co., 4450 W. Carroll Ave., Chicago, IL 60624) was mixed according to direction (60 grams N.S. Stripper powder, 12 grams caustic soda and 120 grams sodium cyanide in 1,000 ml. water). In order to synthesize a "spent" solution, the following metals were dissolved into the stripping solution: 11 g nickel, 10 g copper, 3 g zinc, 1 g iron and 1 g tin.

The synthetic "spent" stripper was then treated in accordance with the method of the invention, being flash evaporated as in Experiment 1, with a retort temperatures of 600° C., 700° C. and 800° C. The cyanide concentration in the condensate was found to be 970 ppm, 475 ppm and 85.2 ppm, respectively.

The synthetic "spent" stripper was also treated in accordance with the invention but with the additional step of oxygen introduction to the retort, as in EXPERIMENT 3. The retort temperature was maintained at about 800° C. and the condensate which collected after a one hour run had a cyanide concentration of only 1.2 ppm. This experiment clearly shows that highly toxic, high concentration cyanide wastes, such as those generated in the electroplating industry can be successfully treated for disposal by practicing the method of the present invention.

EXPERIMENT 5

In another experiment, the method of the invention was tested to determine how effectively it could decompose cyanide in a solid form.

Figure 6:
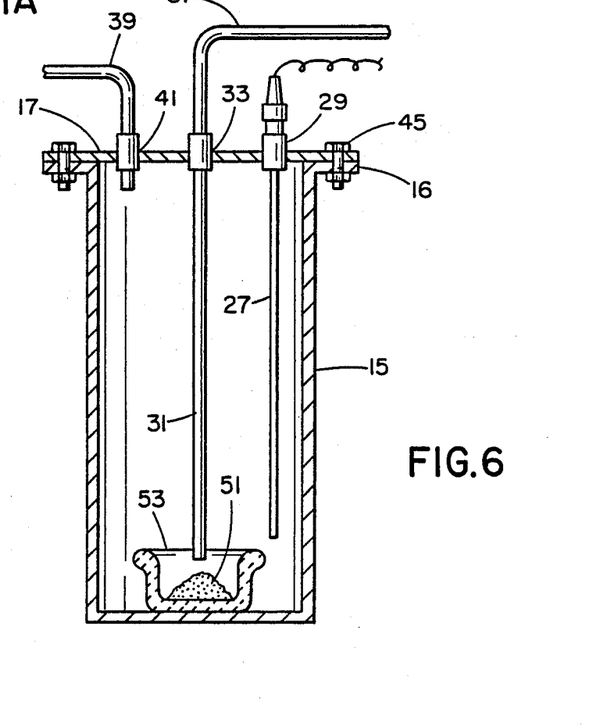
FIG. 6 is a cross-sectional, front elevation of the closed retort shown in FIG. 1, but which has been modified for treating a cyanide-bearing solid.

The baffle 18 and the wire mesh 46 were removed from the closed retort 15. Approximately 30 grams of pure, reagent grade sodium cyanide 51 were placed inside an iron cup 53 which, in turn, was placed at the bottom of the closed retort 15, as shown in FIG. 6. The input conduit 31 from the solution holding receptacle 19 was extended through the retort lid 17 to a point just above the solid sodium cyanide 51.

The closed retort 15 was then heated to and maintained at a temperature between about 580° C. and 620° C. The holding receptacle 19 was filled with tap water, pressurized and the water introduced into the closed retort 15 at a rate of about 5 ml per minute. A sample of the effluent was taken from the collection flask 23 approximately every 30 minutes until the termination of the test, after 120 minutes. A total of 540 ml of water was introduced into the closed retort.

The condensate which was collected carried a strong odor of ammonia, the intensity of which decreased with each successive sample collected. The distillate collected between 90 and 120 minutes of running time was sent out for analysis and was found to have a cyanide concentration of about 101 parts per million.

After the last sample of condensate was collected, the closed retort 15 was allowed to cool and the residue in the pipe cap was removed. About 12.1 grams of a grayish white solid substance was recovered from the iron cup 53. Five grams of the recovered substance was dissolved in 110 ml of tap water. This sample was sent out for independent analysis and it was reported to contain only 27 ppm cyanide. A solution of five grams of pure sodium cyanide in 110 ml of water should have cyanide concentration over 23,000 ppm.

It is clear, therefore, that the method of the present invention is applicable to the decomposition of a cyanide-bearing material in solid form, such as cyanide-contaminated hazardous waste sites.

EXPERIMENTS 6, 7, 8 AND 9

In these experiments, the treatment method of the present invention was performed on other types of cyanide compounds to determine the extent of decomposition of the cyanide radical associated with each compound.

Potassium cyanate (KOCN, EXPERIMENT 6), sodium cyanamide ($Na_2NCN$, EXPERIMENT 7) and acetonitrile ($CH_3CN$, EXPERIMENT 8) were added to tap water to form aqueous solutions of about 30,000 ppm CN. The solutions were then treated in accordance with the present invention, without the addition of oxygen, and by the method of flash evaporation, as previously described in connection with experiments 1 and 2. The temperature of the retort ranged from about 300° C. to about 800° C. Quantitative determination of the cyanide in the condensate and residue, integrated over the entire temperature range, showed that an excess of 99% of the cyanide radical had been decomposed in each instance.

Next, the method of the invention was applied to the decomposition of the cyanide radical associated with a ferric ferrocyanide, which, according to references, does not substantially decompose by the application of prior art methods. Fifteen grams of reagent grade Prussian blue ($Fe_4[Fe(CN)_6]_3$, EXPERIMENT 9) was treated in a manner identical to the treatment of solid sodium cyanide described in EXPERIMENT 5, with the temperature of the closed retort maintained at about 700° C. Quantitative measurements of the residue and condensate revealed cyanide destruction or decomposition in excess of 97%. The residue in the retort appeared as a black solid which was readily attracted to a magnet (Prussian blue is nonmagnetic). The cyanide concentration of the residue was only about 40 ppm and the condensate carried with it about 300 ppm cyanide.

In each of EXPERIMENTS 6, 7, and 8, an attempt was made to determine the critical temperature for the new cyanide compounds which were tested. When cyanide concentration of the condensate was plotted as a function of retort temperature, two of the three compounds tested (KOCN and $Na_2NCN$) revealed the characteristic peaked or bell-shaped curve associated with the determination of critical temperature as heretofore described. Only the acetonitrile showed an anomaly, the cyanide concentration in the condensate increasing at retort temperatures above 600° C.

It should be noted however, that the overall range of cyanide concentrations measured in the condensates, varied from about one to forty ppm. It is believed that the peaks (KOCN and Na$_2$NCN) and anomalous (CH$_3$CN) curve could be within experimental error, caused by the present inventors' inability to effectively clean the apparatus 13, especially the condensation coil 21 and receiver 23. Furthermore, the critical temperature for these compounds may indeed be below the lowest temperature tested. Most importantly, EXPERIMENTS 6, 7, 8 and 9 reveal very efficient decomposition of the cyanide radical in both solid and liquid cyanide-bearing materials.

In each of the preceding EXPERIMENTS, the method of the invention was carried out at ambient pressure. That is to say, while the present inventors recognize that transient or even steady state pressures, somewhat greater than atmospheric, may have resulted in the closed retort (due to the conversion of water to steam coupled with a condenser that may not be 100% efficient and the introduction of an oxygen-bearing gas under a slight pressure), no intentional steps were taken to carry out the process at an elevated pressure. It is believed possible to carry out the invention at elevated pressures, but clearly not required for efficient decomposition. As used herein, then, practicing the invention "substantially at or near atmospheric pressure" means that no intentional steps are taken to increase the pressure in the closed retort beyond that caused by introduction and reaction of the cyanide-bearing waste or material, water and, if used, an oxygen-bearing gas, carried out at or above the critical temperature.

As previously mentioned, a plain carbon steel material was used to construct the closed retort 15 employed to practice the method of the invention as described in the above EXPERIMENTS. It should be noted that above temperatures of about 800°-850° C., even without the additional step of introducing an oxygen-bearing gas, retort deterioration proceded quite rapidly. Special, high temperature service alloys could be employed in retort construction and the method of the invention could be carried out at temperatures greater than those used in the EXPERIMENTS disclosed herein. This is particularly true if the step of introducing an oxygen-bearing gas is eliminated or if the formation of oxides of nitrogen can be tolerated.

The method of the present invention, a method for decomposing the cyanide radical in a cyanide-bearing waste or material, has been shown, by various examples, to be effective for treating a number of different cyanide-bearing substances. The examples and preferred embodiments are included for purposes of clarity and illustration and it will be apparent to those skilled in the art that various modifications, alternatives and equivalents of the method of the invention and appartus used to practice the same, can be made without departure from the spirit of the invention. The scope of the invention, then, should be defined only by the appended claims and equivalents thereof.

What is claimed is:

1. A method for chemically decomposing the cyanide radical in a cyanide-bearing waste or material comprising the steps of:
    introducing said cyanide-bearing waste or material into a closed retort;
    introducing water into said closed retort;
    heating said closed retort to a temperature in excess of the critical temperature of reaction between water and the cyanide radical so that said water hydrolyzes with and decomposes a substantial quantity of said cyanide radical in said cyanide-bearing waste or material sufficient to form at least two new chemical products one of which includes the carbon constituent and the other of which includes the nitrogen constituent of said cyanide radical; and
    venting, from said closed retort, a substantial portion of any gaseous products which result from the preceding steps.

2. A method for decomposing the cyanide radical in a cyanide-bearing waste or material in accordance with claim 1 further comprising the step of condensing a substantial portion of said vented gaseous products.

3. A method for decomposing the cyanide radical in a cyanide-bearing waste or material in accordance with claim 1 wherein said method is carried out substantially at or near atmospheric pressure.

4. A method for decomposing the cyanide radical in a cyanide-bearing waste or material in accordance with claim 3 wherein said critical temperature is about 500° centigrade.

5. A method for decomposing the cyanide radical in a cyanide-bearing waste or material in accordance with claim 1 wherein said critical temperature is about 500° C.

6. A method for decomposing the cyanide radical in a cyanide-bearing waste or material in accordance with claim 1 wherein said closed retort is fabricated from an iron-carbon alloy.

7. A method for decomposing the cyanide radical in a cyanide-bearing waste or material in accordance with claim 1 further comprising the step of maintaining the temperature of said closed retort below about 850° C.

8. A method for decomposing the cyanide radical in a cyanide-bearing waste or material in accordance with claim 1 further comprising the step of introducing an oxygen-bearing gas into said closed retort.

9. A method for decomposing the cyanide radical in a cyanide-bearing waste or material in accordance with claim 8 wherein said closed retort is maintained at a temperature between about 700° C. and 850° C.

10. A method for decomposing the cyanide radical in a cyanide-bearing waste or material in accordance with claim 1 wherein said new product which includes the carbon constituent from said cyanide radical is chosen from the group comprising elemental carbon, carbon dioxide, carbon monoxide or a carbonate.

11. A method for decomposing the cyanide radical in a cyanide-bearing waste or material in accordance with claim 1 wherein said new product which includes the nitrogen constituent from said cyanide radical is chosen from the group comprising diatomic nitrogen, ammonia, a nitride or an oxide of nitrogen.

12. A method for decomposing the cyanide radical in a cyanide-bearing waste or material in accordance with claim 11 further comprising the steps of:
    introducing said cyanide-bearing waste into said closed retort at a predetermined rate, in a continuous or semi-continuous manner;
    introducing an oxygen-bearing gas into said closed retort; and
    varying the rate of introduction of said oxygen-bearing gas into said closed retort in direct proportion to the rate of introduction of said cyanide radical contained in said cyanide-bearing waste so that the formation of oxides of nitrogen is minimized.

13. A method for decomposing the cyanide radical in a cyanide-bearing waste or material in accordance with claim 1 further comprising the step of causing turbulence and mixing of any gaseous products which form in said closed retort, before said step of venting said gaseous products.

14. A method for decomposing the cyanide radical in aqueous cyanide solutions comprising the steps of:
heating a closed retort and maintaining said retort at a temperature above the critical temperature for reaction between the cyanide radical and water in said aqueous solution;
introducing said aqueous cyanide solution into said closed retort in such a manner that said aqueous cyanide solution undergoes flash evaporation and a substantial portion of the water and cyanide radical hydrolyzes sufficiently to form at least two new products, one of which includes the carbon constituent and the other of which includes the nitrogen constituent from said cyanide radical; and
venting from said retort gaseous products which form from the preceding steps.

15. A method for decomposing the cyanide radical in aqueous cyanide solutions in accordance with claim 14 further comprising the step of introducing an oxygen-bearing gas into said closed retort, simultaneous with the introduction of said aqueous cyanide solution.

16. A method for decomposing the cyanide radical in aqueous cyanide solutions in accordance with claim 14 further comprising the step of introducing said aqueous cyanide solution into said closed retort in the form of an atomized spray so that the atomized droplets in said spray undergo flash evaporation.

17. A method for decomposing the cyanide radical in aqueous cyanide solutions in accordance with claim 14 further comprising the step of creating turbulent mixing of gases formed in said closed retort.

18. A method for decomposing the cyanide radical in aqueous cyanide solutions in accordance with claim 14 wherein said critical temperature is about 500° C.

19. A method for decomposing the cyanide radical in aqueous cyanide solutions in accordance with claim 14 wherein said closed retort is maintained between about 700° C. and 850° C.

20. A method for decomposing the cyanide radical in a cyanide-bearing waste or material comprising the steps of:
introducing said cyanide bearing waste or material into a closed retort;
introducing superheated steam into said closed retort so that said steam comes into contact with said cyanide-bearing waste or material;
heating said closed retort to a temperature in excess of the critical temperature for reaction between said superheated steam and said cyanide radical; and
hydrolyzing to form reaction products from said steam and cyanide radical reaction comprising ammonia and a carbonate.

21. A method for decomposing the cyanide radical in a cyanide-bearing waste or material in accordance with claim 20 further comprising the step of maintaining the pressure inside said closed retort substantially at or near atmospheric pressure by allowing gases in said closed retort to escape therefrom by means of a vent formed in said closed retort.

22. A method for decomposing the cyanide radical in a cyanide-bearing waste or material in accordance with claim 20 further comprising the step of introducing an oxygen-bearing gas into said closed retort.

23. A method for decomposing the cyanide radical in a cyanide compound contained in a cyanide-bearing waste or material comprising the steps of:
hydrolyzing a substantial portion of said cyanide compound to produce hydrocyanic acid;
hydrolyzing a substantial portion of said cyanide compound to produce a carbonate; and
hydrolyzing a substantial portion of said hydrocyanic acid to produce ammonia.

24. A method for decomposing the cyanide radical in a cyanide compound contained in a cyanide-bearing waste or material in accordance with claim 23 further comprising the step of carrying out said hydrolysis reactions in a closed retort.

25. A method for decomposing the cyanide radical in a cyanide-bearing waste or material in accordance with claim 24 further comprising the step of carrying out said hydrolysis reactions at a temperature in excess of a critical temperature, $T_c$.

26. A method for decomposing the cyanide radical in a cyanide compound contained in a cyanide-bearing waste or material in accordance with claim 25 wherein said critical temperature is about 500° C.

27. A method for decomposing the cyanide radical in a in a cyanide compound contained in a cyanide-bearing waste or material in accordance with claim 26 wherein said hydrolysis reactions are carried out at a temperature less than about 850° C.

28. A method for decomposing the cyanide radical in a cyanide-bearing waste or material in accordance with claim 23 further comprising the step of reacting a substantial portion of said cyanide radical and said ammonia with oxygen.

29. A method for decomposing the cyanide radical in a cyanide compound contained in a cyanide-bearing waste or material in accordance with claim 23 wherein:
said hydrolysis of said cyanide compound to form hydrocyanic acid takes place according to the reactions:

$$M(CN)_x + H_2O = HCN + M(OH)_x$$

and $$(2/x)M(CN)_x + 3H_2O = M_{(2/x)}CO_3 + HCN + H_2;$$

said hydrolysis of said cyanide compound to form a carbonate takes place according to the reaction:
$$(2/x)M(CN)_x + 3H_2O = M_{(2/x)}CO_3 + HCN + H_2;$$

and
said hydrolysis of said hydrocyanic acid takes place according to the reaction:

$$HCN + H_2O = NH_3 + CO$$

wherein M is a metal, alkali-metal, alkaline earth metal or radical and x is the valency of said metal, alkali-metal, alkaline-earth metal or radical.

30. A method for decomposing the cyanide radical in a cyanide compound contained in a cyanide-bearing waste or material in accordance with claim 23 wherein:
said hydrolysis of said cyanide compound to form hydrocyanic acid takes place according to the reactions:

$$M(CN)_x + H_2O = HCN + M(OH)_x$$

and $$(2/x)M(CN)_x + 3H_2O = M_{(2/x)}CO_3 + HCN + H_2;$$

said hydrolysis of said cyanide compound to form a carbonate takes place according to the reactions:

$$(2/x)M(CN)_x + 3H_2O = M_{(2/x)}CO_3 + HCN + H_2;$$

and $$(2/x)M(CN)_x + 3H_2O = M_{(2/x)}CO_3 + C + 2NH_3;$$

and
said hydrolysis of said hydrocyanic acid takes place according to the reaction:

$$HCN + H_2O = NH_3 + CO$$

wherein M is a metal, alkali-metal, alkaline earth metal or radical and x is the valency of said metal, alkali-metal, alkaline-earth metal or radical.

* * * * *